June 9, 1953 C. E. HALLMARK 2,641,694

PULSE COUNTER

Filed April 27, 1946

INVENTOR
CLYDE E. HALLMARK

BY [signature]

ATTORNEY

Patented June 9, 1953

2,641,694

UNITED STATES PATENT OFFICE 2,641,694

PULSE COUNTER

Clyde E. Hallmark, Fort Wayne, Ind., assignor, by mesne assignments, to Farnsworth Research Corporation, a corporation of Indiana Application April 27, 1946, Serial No. 665,593

19 Claims. (Cl. 250—27)

Figure 1:
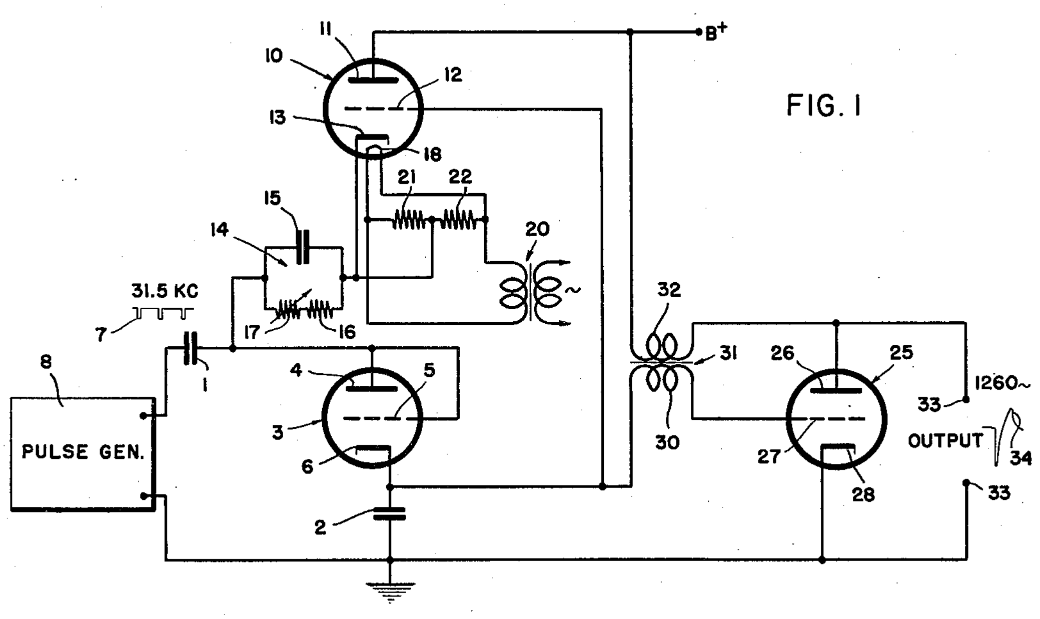

This invention relates to frequency dividers, and particularly relates to an impulse counter circuit with which large count-down ratios may be realized.

A conventional impulse counter comprises a charging condenser and a storage condenser connected in series through a diode. Accordingly, an input pulse applied to the charging condenser will charge the storage condenser through the diode. Between successive pulses the charging condenser is brought to a fixed potential, such as ground, and therefore, the voltage increments applied to the storage condenser in response to successive input pulses decrease exponentially so that the voltage across the storage condenser approaches gradually the voltage of the input pulses. Consequently, the voltage which can be built up across the storage condenser is limited by the voltage of the input pulses which must be comparatively large.

A serious drawback of conventional impulse counters, however, is the decrease of successive voltage increments applied across the storage condenser. Usually the storage condenser is discharged after a predetermined number of input pulses by a triggering device, such as a discharge tube which operates by amplitude selection. Thus the last voltage increment applied to the storage condenser must exceed a certain value in order to assure that the triggering device will be actuated after a predetermined number of input pulses. This requirement limits the count-down ratio available with conventional impulse counters to the order of 10 to 1. A counter circuit where successive voltage increments applied to the storage condenser are equal would therefore have no theoretical limit of the count-down ratio obtainable with such a circuit.

Impulse counters of the type referred to may be used for counting pulses developed in response to radio-active radiations which may consist of electrons, protons and other positively charged particles, or in response to cosmic ultra radiation. Furthermore, counter circuits may be used for stepping down or reducing the frequency of a high frequency wave for comparing its frequency or phase with that of a low frequency wave. In a television transmitting system, for example, the frequencies of the line and field frequency waves must have a constant predetermined ratio. In order to keep this ratio constant, the frequency of the line frequency wave may be stepped down until it equals that of the field frequency wave so that their phases may be compared directly. In all these cases, counter circuits having high count-down ratios are desirable, and in some applications they are a necessity. Conventional impulse counters which have a low count-down ratio, therefore, have not been utilized to any extent for frequency comparison purposes.

It is an object of the present invention, therefore, to provide a novel impulse counter where successive voltage increments developed across a storage condenser in response to input pulses are of equal size.

Another object of the invention is to provide an electric counter circuit having a large count-down ratio which is only dependent upon the negative voltage developed by a blocking oscillator and periodically impressed upon the storage condenser, upon the capacitance ratio of the charging and the storage condenser and upon the peak voltage of the input pulses.

A further object of the invention is to provide a frequency divider where equal voltage increments are developed across a storage condenser in response to successive input pulses, the voltage increments being independent of undesired changes of the anode voltage supply.

In accordance with the present invention, there is provided an impulse counter comprising a first electric storage device, a second electric storage device and means for connecting the storage devices. Means are provided for applying pulses to the first storage device and means controlled by the storage devices for applying across the second storage device substantially equal voltage increments in response to the pulses. Means are finally provided which are responsive to and operative at a predetermined voltage across the second storage device for bringing the second storage device to a predetermined potential.

For a better understanding of the invention, together with other and further objects thereof, reference is made to the following description, taken in connection with the accompanying drawing, and its scope will be pointed out in the appended claims.

Figure 2:
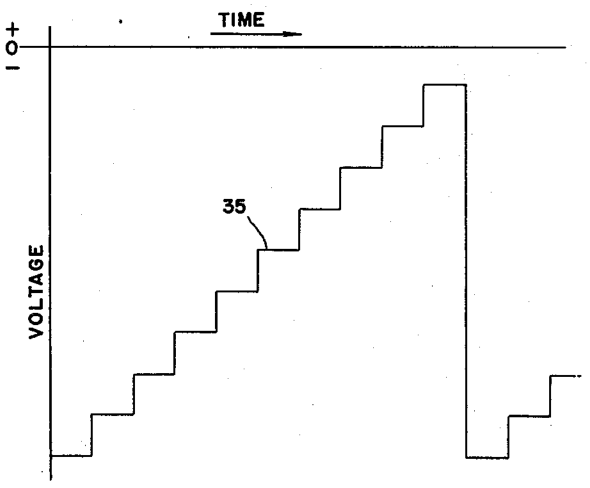

In the accompanying drawing, Fig. 1 is a circuit diagram of an impuse counter embodying the present invention, while Fig. 2 is a graph representing the voltage across the storage condenser plotted against time.

Referring now to Fig. 1 of the drawing, there is provided charging condenser 1 and storage condenser 2 connected in series through triode 3 which is arranged as a diode. Triode 3 comprises anode 4, control grid 5 and cathode 6. Control grid 5 is connected to anode 4 so that discharge tube 3 functions as a diode suitable for high frequency work. Instead of triode 3, any other suitable unilaterally conducting device such as a diode may be used. Input pulses 7, which are of negative polarity as indicated, are developed by pulse generator 8 and impressed upon charging condenser 1.

For the purpose of applying substantially equal voltage increments across storage condenser 2 in response to input pulses 7, there is provided discharge tube 10 comprising anode 11, control grid 12 and cathode 13. Anode 11 is connected to a suitable anode voltage supply indicated at B+. Control grid 12 is connected to the junction point between cathode 6 of diode 3 and storage condenser 2. Cathode 13 is connected to charging condenser 1 through cathode impedance 14 comprising condenser 15 by-passed by resistors 16, 17, one of which may be adjustable as illustrated.

Cathode 13 may be indirectly heated by filament 18 connected across the secondary winding of transformer 20. The primary winding of transformer 20 may be connected to an alternating current source as indicated. Resistors 21, 22 are connected in parallel across filament 18. Cathode 13 is connected between resistors 21 and 22 to keep the average potential of filament 18 equal to that of cathode 13. Transformer 20 isolates the alternating current source connected to the primary winding of the transformer with respect to the average potential of cathode 13.

For the purpose of periodical discharging storage condenser 2 when the voltage thereacross has reached a predetermined value, there is provided discharge tube 25 arranged as a blocking oscillator. Blocking oscillator 25 comprises anode 26, control grid 27 and cathode 28 which is grounded as illustrated. Control grid 27 is connected through inductance element 30 to the junction point between cathode 6 and storage condenser 2. Inductance element 30 forms one winding of transformer 31, the other winding 32 of which is connected between anode 26 and anode voltage supply B+. For high frequency pulses, the iron core of transformer 31 may be omitted. The output signal consisting of pulses 34 at a reduced frequency may be obtained from output terminals 33 connected between anode 26 and ground.

It is believed that the impulse counter of the invention operates in the following manner. Let it be assumed that initially a negative voltage is impressed upon storage condenser 2. Consequently, diode 3 will become conductive, and the negative charge on storage condenser 2 will be distributed between condensers 1 and 2 in accordance with their capacitance ratio. At the same time the initial negative voltage is also impressed upon control grid 12 of tube 10 thus biasing it to cut-off.

Upon the arrival of the first input pulse 7 of negative polarity charging condenser 1 will be driven to a still higher negative potential. Accordingly, anode 4 of diode 3 is now negative with respect to cathode 6 so that no space current can flow through diode 3. On the other hand, the negative voltage impressed upon charging condenser 1 is also impressed upon cathode 13 of discharge tube 10 so that tube 10 will now begin to conduct space current. Charging condenser 1 will therefore obtain a positive charge through discharge tube 10 and cathode impedance 14. This current will continue to flow until the voltage of cathode 13 has been raised sufficiently toward ground to cut off tube 10. The charge which charging condenser 1 receives through tube 10 in response to an input pulse is determined by the voltage drop across cathode impedance 14, that is, by the bias potential across condenser 15. Accordingly, charging condenser 1 is charged to a voltage which is slightly below that of storage condenser 2 in view of the voltage drop across cathode impedance 14, thus preventing the flow of space current through diode 3.

Upon the arrival of the trailing edge of input pulse 7, the voltage of charging condenser 1 is further raised so that now anode 4 is positive with respect to cathode 6 of diode 3, whereupon diode 3 begins to conduct space current. Accordingly, a portion of the charge which charging condenser 1 has previously received through tube 10 is now utilized for charging storage condenser 2. Consequently the voltage of cathode 6 of diode 3 and of storage condenser 2 is elevated toward ground. Between successive input pulses 7, tube 10 will remain cut off because its cathode 13 is positive with respect to control grid 12.

The voltage across storage condenser 2 is thus successively elevated toward ground by equal voltage increments in response to input pulses 7. After a predetermined number of input pulses, the potential across storage condenser 2 has been raised sufficiently to fire blocking oscillator 25. The number of input pulses required to raise the potential across storage condenser 2 by a sufficient amount depends upon the capacitance ratio of condensers 1 and 2, upon the magnitude of the initial negative potential impressed upon storage condenser 2 and upon the amplitude of input pulses 7. When blocking oscillator 25 fires, storage condenser 2 and cathode 6 of diode 3 are driven to a high negative potential which may be of the order of −500 volts. This completes one counting cycle, and the operation begins again in the manner previously described.

The voltage across storage condenser 2 with respect to time has been indicated schematically in Fig. 2. Curve 35 indicates the voltage increments which are of substantially equal size. Actually, due to leakage current across storage condenser 2, the voltage across storage condenser 2 will decrease with time between individual voltage increments. The leakage current, however, depends upon the magnitude of the voltage across the condenser, and therefore only the first voltage increments of curve 35 will be decreased by leakage current while the last voltage increments are of equal size in view of the decreased voltage across storage condenser 2. Thus the last voltage increments upon which the firing of blocking oscillator 25 depends are practically of equal size as desired.

With the circuit illustrated in Fig. 1, a count-down ratio of 100 to 1 has been obtained. It is entirely feasible to obtain a count-down ratio of 500 to 1 with one counter circuit. All that is necessary is to utilize a blocking oscillator 25 which will develop a negative voltage which is so large that only after 500 input pulses, the voltage across storage condenser 2 will be sufficiently raised to again fire blocking oscillator 25.

It is to be noted that the count-down ratio is practically independent upon undesired changes of the anode voltage supply B+. The initial negative potential impressed upon storage condenser 2 by blocking oscillator 25 depends upon the anode voltage supply B+ which is connected to anode 26 of blocking oscillator 25. Furthermore, the amplitude of input pulses 7 may also be made dependent upon the anode voltage supply B+ by energizing pulse generator 8 by the same anode voltage supply B+.

If desired, a second counter circuit which may be identical with that illustrated in Fig. 1 may be connected to output terminals 33. Two such counters have been utilized, one having a count-down ratio of 25 to 1 and the other one having a count-down ratio of 21 to 1 in order to obtain a combined count-down ratio of 525 to 1 which is the number of lines per television frame.

The impulse counter of the invention may also be used for controlling the frequency of an ultra-high frequency generator by a low frequency wave developed by a crystal controlled generator. To this end, the frequency of the high frequency wave may be stepped down by the counter circuit of the invention and its phase compared to that of the crystal controlled wave, thereby to derive a control signal for controlling the frequency of the high frequency wave. In this case the input signal of the impulse counter will consist of a sinusoidal wave, and it is to be understood that the term pulses as used in the claims is meant to include a wave, such as a sinusoidal wave.

While it will be understood that the circuit specifications of the impulse counter of the invention may vary according to the design for any particular application, the following circuit specifications for an impulse counter are included, by way of example only, as suitable for a count-down ratio of 25 to 1.

| | |
|---|---|
| Frequency of input pulses 7. | 31.5 kilocycles per second. |
| Frequency of output pulses 34. | 1,260 cycles per second. |
| Peak amplitude of input pulses 7. | —300 volts. |
| Peak-to-peak voltage of curve 35. | 470 volts. |
| Positive potential of anode voltage supply B+. | +300 volts. |
| Triode 3 | ½ type 6SL7-GT. |
| Triode 10 | ½ type 6SL7-GT. |
| Triode 25 | ½ type 6SN7-GT. |
| Condenser 1 | 150 micro-microfarads. |
| Condenser 2 | 825 micro-microfarads. |
| Condenser 15 | .5 microfarad. |
| Resistor 16 | 1,000,000 ohms. |
| Adjustable resistor 17 | 1,000,000 ohms. |
| Resistor 21 | 56 ohms. |
| Resistor 22 | 56 ohms. |
| Voltage impressed across secondary winding of transformer 20. | 6.3 volts. |
| Transformer 31 | Wound on laminated audio iron core. |
| Winding 32 | 225 turns, 70 microhenries. |
| Winding 30 | 450 turns, 260 microhenries winding sense of windings 30 and 32 in aiding direction. |

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An impulse counter comprising a charging condenser, a storage condenser, unilaterally conducting means for connecting said condensers in series, means for applying pulses to said charging condenser, an electron discharge device controlled by the voltages across said condensers for applying across said storage condenser substantially equal voltage increments in response to said pulses, and means responsive to and operative at a predetermined voltage across said storage condenser for discharging said storage condenser to a predetermined potential.

2. An impulse counter comprising a source of pulses to be counted, a first potential storage element coupled to said source, a second potential storage element, an electron discharge device controlled by said elements for boosting the potential of said first element, potential responsive means coupled between said elements for charging said second element by said first element, and means for discharging said second element after a predetermined number of pulses is stored.

3. An impulse counter comprising a source of pulses to be counted, a first potential storage element coupled to said source, a second potential storage element, an auxiliary source of potential coupled to said elements and controlled by the potentials of said elements for boosting the potential of said first element so that it has a predetermined difference with respect to that of said second element, potential responsive means provided between said elements for charging said second element by said first element, and means for discharging said second element after a predetermined number of pulses is stored.

4. An impulse counter comprising a first electric storage device, a second electric storage device, means for connecting said storage devices in series, means for applying pulses to said first storage device, an electron discharge device coupled to said devices and controlled by the voltages across said storage devices for charging in response to each pulse said first storage device to a voltage having a predetermined difference with respect to that of said second storage device, said second storage device being charged by said first storage device, and means responsive to and operative at a predetermined voltage across said second storage device for driving said second storage device to a predetermined potential.

5. An impulse counter comprising a charging condenser, a storage condenser, unilaterally conducting means for connecting said condensers in series, means for impressing pulses upon said charging condenser, an electron tube coupled to said condensers and controlled by the voltages across said condensers for charging in response to each pulse said charging condenser to a voltage having a predetermined difference with respect to that of said storage condenser, said storage condenser being charged by said charging condenser, and means responsive to and operative at a predetermined voltage across said storage condenser for bringing said storage condenser to a predetermined potential.

6. An impulse counter comprising a charging condenser, a storage condenser, unilaterally conducting means for connecting said condensers in series, means for impressing input pulses of negative polarity upon said charging condenser, an electron discharge tube coupled to said condensers and controlled by the voltages across said condensers for charging in response to each pulse said charging condenser to a voltage having a predetermined difference with respect to that of said storage condenser, said storage condenser being charged by said charging condenser, and means responsive to and operative at a predetermined voltage across said storage condenser for bringing said storage condenser to a predetermined potential.

7. An impulse counter comprising a charging condenser, a storage condenser, unilaterally conducting means for connecting said condensers in series, means for impressing input pulses of negative polarity upon said charging condenser, a vacuum tube coupled to and controlled by the voltages across said condensers for charging said charging condenser in response to each pulse to a voltage having a predetermined difference with respect to that of said storage condenser, said storage condenser being charged by said charging condenser, and means responsive to and operative at a predetermined voltage across said storage condenser for discharging said storage condenser and consequently said charging condenser to a negative potential of predetermined value.

8. An impulse counter comprising a first electric storage device, a second electric storage device, means for connecting said storage devices, means for applying pulses to said first storage device, a discharge tube having a cathode and a control grid, one of said storage devices being coupled to said grid and the other one of said storage devices being coupled to said cathode, said tube being controlled by the voltages across said storage devices and rendered conductive in response to said pulses, thereby to apply substantially equal voltage increments across said second storage device, and means responsive to and operative at a predetermined voltage across said second storage device for bringing it to a predetermined potential.

9. An impulse counter comprising a first electric storage device, a second electric storage device, means for connecting said storage devices in series, means for applying pulses to said first storage device, a discharge tube having a cathode and a control grid, one of said storage devices being coupled to said grid and the other one of said storage devices being coupled to said cathode, said tube being controlled by the voltages across said storage devices and rendered conductive in response to said pulses, thereby to charge said second storage device by substantially equal voltage increments, and means responsive to and operative at a predetermined voltage across said second storage device for bringing it to a predetermined potential.

10. An impulse counter comprising a charging condenser, a storage condenser, means for connecting said condensers in series, means for applying pulses to said charging condenser, a discharge tube having a cathode and a control grid, said storage condenser being coupled to said grid, said charging condenser being coupled to said cathode, said tube being controlled by the voltages across said condensers and rendered conductive in response to said pulses, thereby to apply substantially equal voltage increments across said storage condenser and means responsive to and operative at a predetermined voltage across said storage condenser for bringing it to a predetermined potential.

11. An impulse counter comprising a charging condenser, a storage condenser, unilaterally conducting means for connecting said condensers in series, means for impressing pulses upon said charging condenser, a discharge tube having a cathode, a control grid and an anode, an anode voltage supply connected to said anode, said grid being connected to said storage condenser, a cathode impedance connected between said cathode and said charging condenser, and means responsive to and operative when the voltage across said storage condenser has reached a predetermined value for discharging said storage condenser to a predetermined potential.

12. An impulse counter comprising a charging condenser, a storage condenser, unilaterally conducting means for connecting said condensers in series, means for impressing input pulses of negative polarity upon said charging condenser, a discharge tube having a cathode, a control grid and an anode, an anode voltage supply connected to said anode, said grid being connected to said storage condenser, a cathode impedance connected between said cathode and said charging condenser, and means responsive to and operative when the voltage across said storage condenser has reached a predetermined value for discharging said storage condenser to a predetermined negative potential.

13. An impulse counter comprising a charging condenser, a storage condenser, unilaterally conducting means for connecting said condensers in series, means for impressing pulses upon said charging condenser, a first discharge tube having a cathode, a control grid and an anode, an anode voltage supply connected to said anode, said grid being connected to said storage condenser, a cathode impedance connected between said cathode and said charging condenser, and means including a second discharge tube having its grid coupled to said storage condenser for bringing said storage condenser to a predetermined potential when the voltage thereacross has reached a predetermined value.

14. An impulse counter comprising a charging condenser, a storage condenser, unilaterally conducting means for connecting said condensers in series, means for impressing input pulses of negative polarity upon said charging condenser, a first discharge tube having a cathode, a control grid and an anode, an anode voltage supply connected to said anode, said grid being connected between said storage condenser and said unilaterally conducting means, a cathode impedance connected between said cathode and said charging condenser, and means including a second discharge tube having its grid connected to said storage condenser for bringing said storage condenser to a predetermined negative potential when the voltage thereacross has reached a predetermind value.

15. An impulse counter comprising a charging condenser, a storage condenser, unilaterally conducting means for connecting said condensers in series, means for impressing input pulses of negative polarity upon said charging condenser, a first discharge tube having a cathode, a control grid and an anode, an anode voltage supply connected to said anode, said grid being connected between said storage condenser and said unilaterally conducting means, a cathode impedance connected between said cathode and said charging condenser, and a second discharge tube having a control grid and an anode, a transformer having one of its windings connected between the anode of said second tube and said voltage supply and the other one of its windings connected between the grid of said second tube and said storage condenser thereby to initiate space current in said second tube when the potential across said storage condenser has reached a predetermined value and subsequently to discharge said storage condenser to a predetermined negative potential.

16. An impulse counter comprising a charging condenser, a storage condenser, unilaterally conducting means for connecting said condensers in series, means for impressing input pulses of negative polarity upon said charging condenser, a first discharge tube having a cathode, a control grid and an anode, an anode voltage supply connected to said anode, said grid being connected between said storage condenser and said unilaterally conducting means, a cathode impedance comprising a resistor and a further condenser connected between said cathode and said charging condenser, and a second discharge tube having a control grid and an anode, a transformer having one of its windings connected between the anode of said second tube and said voltage supply and the other one of its windings connected between the grid of said second tube and said storage condenser, thereby to initiate space current in said second tube when the potential across said storage condenser has reached a predetermined value and subsequently to discharge said storage condenser to a predetermined negative potential.

17. The method of counting pulses utilizing electric storage elements which comprises applying pulses to a first of said electric storage elements, charging a second of said electric storage elements by said first element by equal voltage increments, boosting the voltage of said first element, and driving said second element to a predetermined potential after a predetermined number of pulses is stored.

18. The method of counting pulses utilizing electric storage elements which comprises applying pulses to a first of said electric storage elements, charging a second of said electron storage elements by said first element by equal voltage increments, boosting the voltage of said first element to a voltage having a predetermined difference with respect to that of said second element, and bringing said second element to a predetermined potential after a predetermined number of pulses is stored.

19. The method of counting pulses utilizing electric storage elements which comprises applying pulses of negative polarity to a first of said electric storage elements, charging a second of said electric storage elements by said first element by equal voltage increments, increasing the voltage of said first element to a voltage having a predetermined difference with respect to that of said second element, and driving said second element to a negative potential of predetermined value when the voltage across said second element has reached a predetermined value.

CLYDE E. HALLMARK.

References Cited in the file of this patent

UNITED STATES PATENTS

| Number | Name | Date |
|---|---|---|
| 2,110,015 | Fitzgerald | Mar. 1, 1938 |
| 2,113,011 | White | Apr. 5, 1938 |
| 2,392,632 | Berry | Jan. 8, 1946 |
| 2,405,239 | Seeley | Aug. 6, 1946 |
| 2,411,573 | Holst et al. | Nov. 26, 1946 |
| 2,415,567 | Schoenfeld | Feb. 11, 1947 |
| 2,496,337 | DeBoisblanc | Feb. 7, 1950 |